(12) United States Patent
Hiraguchi

(10) Patent No.: US 7,306,182 B2
(45) Date of Patent: Dec. 11, 2007

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 379 days.

(21) Appl. No.: 11/039,957

(22) Filed: Jan. 24, 2005

(65) Prior Publication Data

US 2005/0161547 A1    Jul. 28, 2005

(30) Foreign Application Priority Data

Jan. 22, 2004 (JP) ............................. 2004-014173

(51) Int. Cl.
*G11B 23/107* (2006.01)
(52) U.S. Cl. ....................... 242/348; 360/132
(58) Field of Classification Search ................ 242/348, 242/348.2; 360/132
See application file for complete search history.

(56) References Cited

U.S. PATENT DOCUMENTS

| | | | |
|---|---|---|---|
| 4,555,077 A | 11/1985 | Platter et al. | |
| 5,868,333 A | 2/1999 | Nayak | |
| 5,893,527 A | 4/1999 | Miztutani et al. | |
| 7,077,353 B1* | 7/2006 | Veno et al. | 242/338.2 |
| 2003/0071159 A1 | 4/2003 | Hiraguchi | |
| 2003/0094530 A1 | 5/2003 | Hiraguchi | |
| 2005/0156071 A1 | 7/2005 | Hiraguchi | |

FOREIGN PATENT DOCUMENTS

JP    2000-11591 A    1/2000

* cited by examiner

*Primary Examiner*—John Q. Nguyen
(74) *Attorney, Agent, or Firm*—Sughrue Mion, PLLC

(57) ABSTRACT

A recording tape cartridge having: a case which accommodates a reel for a recording tape; an opening formed at a corner portion of the case; and a door which has a bent portion formed in a substantial L-shape in plan view, and opens and closes the opening, wherein the plate thickness of the bent portion in a direction in which the door rotates is larger than that of the door, and a stepped portion is formed at the further end side from the bent portion of the door, wherein also the case includes a first abutting portion which abuts the door when it is closed, and second abutting portions which abut the end surface of the bent portion at a door distal-end side thereof, and the inner surface of the bent portion, when the closed door is further deflected in a direction of closing the opening.

12 Claims, 5 Drawing Sheets

RECORDING TAPE CARTRIDGE

CROSS-REFERENCE TO RELATED APPLICATION

This application claims priority under 35 USC 119 from Japanese Patent Application No. 2004-014173, the disclosure of which is incorporated by reference herein.

BACKGROUND OF THE INVENTION

1. Field of the Invention

The present invention relates to a recording tape cartridge in which a single reel is accommodated within a case, and a recording tape, such as a magnetic tape or the like, which is mainly used as a recording medium for a computer or the like, is wound around the reel.

2. Description of the Related Art

Conventionally, recording tape cartridges have been known in which a recording tape, such as a magnetic tape or the like, which is used as a data recording medium for a computer or the like, is wound around a single reel, and the reel is rotatably accommodated within a case. The case for such a recording tape cartridge is formed in the shape of a substantially rectangular box by an upper case and a lower case, respectively formed in a substantial tray shape, being joined together in a state in which peripheral walls thereof abut one another.

In such a recording tape cartridge, a leader member such as a leader tape, a leader pin, a leader block or the like is attached to a distal end portion of the recording tape. A pull-out member (not shown) provided at a drive pulls out the leader member, and the recording tape attached to the leader member is pulled out of the case.

The pull-out member of the drive is often provided at a side portion of an opening for loading the recording tape cartridge. Accordingly, in the recording tape cartridge, an opening for pulling out the leader member of the recording tape is often provided at a corner portion of the case. Even if the opening is not provided at the corner portion, the corner portion sometimes has components which are important for the function of the recording tape cartridge, including a hinge of a door for the opening. (For example, see Japanese Patent Application Laid-Open (JP-A) No. 2000-11591.)

The corner portion is most likely to receive concentrated stress when an impact is applied to the recording tape cartridge due to a fall or the like thereof. Such concentrated stress causes the corner portion to be locally deformed permanently (i.e., the corner portion becomes crushed, bent, broken or the like). Therefore, problems arise in that the recording tape cartridge cannot be loaded into the drive, the recording tape cannot be pulled out, the door for the opening cannot be opened or closed, and the like.

Further, even if no permanent deformation is caused, deformation such as a temporary deflection, namely, elastic deformation, may be caused, resulting in separation of the peripheral wall of the upper case from the peripheral wall of the lower case. When such deflection deformation is caused, the leader member such as a leader tape may be dislodged from a portion in the case at which the leader member is held, or may be caught between the peripheral wall of the upper case and the peripheral wall of the lower case. Further, if the door is opened, the leader member may be thrown out of the case.

SUMMARY OF THE INVENTION

In view of the aforementioned, the present invention provides a recording tape cartridge which has excellent impact resistance and in which trouble such as deformation is unlikely to occur even when an impact is applied to the recording tape cartridge due to a fall or the like thereof.

A first aspect of the present invention is a recording tape cartridge including: a case which accommodates a single reel, around which a recording tape is wound, such that the reel is rotatable; an opening formed at a corner portion extending between a front wall and a side wall of the case, the opening being for pulling-out of a leader member which is attached to a distal end portion of the recording tape; and a door which has a bent portion formed in a substantial L-shape in plan view, rotates around a shaft provided at the front wail side, and opens and closes the opening, wherein the plate thickness of the bent portion in a direction in which the door rotates is larger than that of the door, and a stepped portion is formed at the further end side from the bent portion of the door, wherein also the case includes a first abutting portion which abuts the door when the door closes the opening, and second abutting portions which abut the end surface of the bent portion at a door distal-end side thereof, and the inner surface of the bent portion, when the door which has closed the opening is deflected in a direction of closing the opening.

In this case, since the plate thickness of the bent portion in the rotation direction of the door (in the curvature radial direction), which is formed in a substantial L-shape in plan view, is larger than that of the door, even when an impact is applied to the corner portion of the case (the bent portion of the door) due to a fall or the like of the cartridge, permanent deformation or temporary deflection deformation of these portions of the case can be prevented. Further, when the door receives an impact due to a fall of the cartridge and is deflected in the direction of closing the opening, the end surface of the bent portion at a door distal-end side thereof and the inner surface of the bent portion abut the second abutting portions. Since the second abutting portions are formed separately from the first abutting portion, the impact can be received in a preferable manner. Thus, damage (such as permanent deformation) to the door can be prevented.

A second aspect of the present invention is a recording tape cartridge which accommodates a recording tape and is loaded into a drive such that a leader member attached to a distal end portion of the recording tape is pulled by the drive out of the recording tape cartridge so that the recording tape is pulled into the drive for use therein, the recording tape cartridge including: a case which has a top plate and a bottom plate and accommodates therebetween a single reel, around which the recording tape is wound, such that the single reel is rotatable, the case having wall surfaces formed at the circumferences of the top plate and the bottom plate, the tape cartridge being loaded with one of the wall surfaces facing the drive, the case having an opening formed at a corner portion extending from the one of the wall surfaces to another of the wall surfaces continuously formed therefrom, the leader member of the recording tape being pulled out through the opening along a predetermined pull-out path; and a door which rotates to open and close the opening, the door having a bent portion formed so as to correspond to the corner portion, wherein the plate thickness of the bent portion in a direction in which the door rotates is larger than that of the door, and a stepped portion is formed at the further end side from the bent portion of the door, wherein also the case includes a first abutting portion which abuts the door when the door closes the opening, and second abutting portions which abut the end surface of the bent portion at a door distal-end side thereof, and the inner surface of the bent portion, when the door which has closed the opening is deflected in a direction of closing the opening.

The bent portion of the door may include a receiving portion which is provided at an inner surface thereof to receive a distal end portion of the leader member. Further, a predetermined clearance may be formed between the distal end portion of the leader member and the inner surface of the bent portion.

The clearance may be formed so as to be larger than play of the door with respect to the case in the direction in which the door rotates.

The receiving portion may have a guide portion, which is a tapered surface formed such that the inner surface of the bent portion becomes thicker toward a central portion of the bent portion in plan view. The guide portion may deflect the distal end portion of the leader member toward the central portion of the bent portion.

A predetermined clearance may be formed between the second abutting portions and the portions of the door which abut the second abutting portions.

Moreover, in the recording tape cartridge, a portion of the door which abuts the first abutting portion may be a distal-end-side end surface of a stepped portion of the door. The distal-end-side end surface of the stepped portion and a distal-end-side end surface of the bent portion may be inclined such that imaginary extensions thereof intersect each other at an inner side of the door in plan view.

In this case, the distal-end-side end surface of the stepped portion which abuts the first abutting portion and the distal-end-side end surface of the bent portion which abuts the second abutting portion are inclined such that imaginary extensions thereof intersect each other at an inner side of the door in plan view. That is, the first abutting portion and the second abutting portion are also inclined such that imaginary extensions thereof intersect each other at an inner side of the door in plan view.

Therefore, when the door receives an impact due to a fall or the like of the cartridge, the impact can be received first by the second abutting portions in a preferable manner. Then, the first abutting portion can deflect the distal end portion of the door such that the distal end portion escapes toward the outside. Thus, damage to the door or permanent deformation thereof can further be prevented.

As described above, the present invention can provide a recording tape cartridge which has excellent impact resistance and in which trouble such as deformation is unlikely to occur even when an impact is applied to the recording tape cartridge due to a fall or the like thereof.

DETAILED DESCRIPTION OF THE INVENTION

Hereinafter, an embodiment of the present invention will be described in detail on the basis of the drawings. For convenience of explanation, the direction in which the recording tape cartridge is loaded into a drive (the direction of arrow A) is called the "front direction", and the other directions, namely, rear, left (the direction of arrow B), right, top, and bottom will be specified and expressed on the basis of this front direction.

Figure 1:
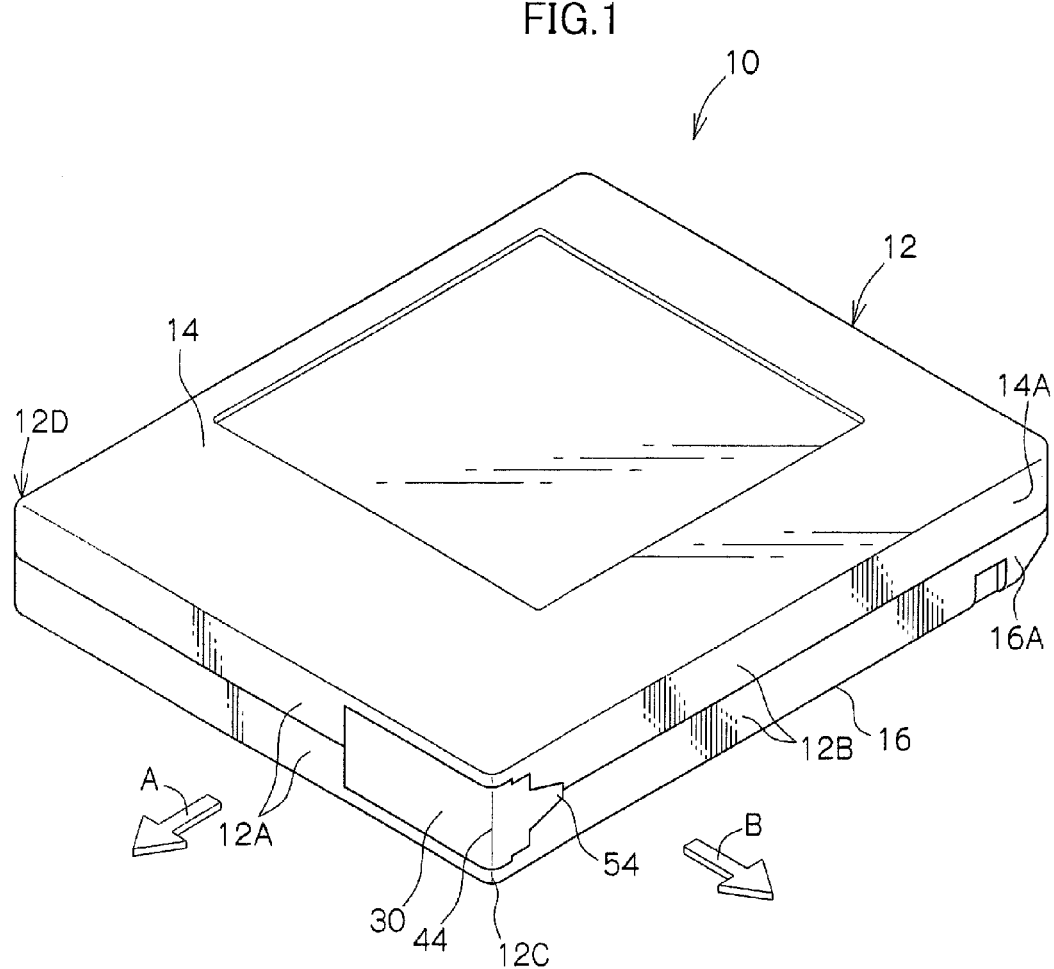
FIG. 1 is a schematic perspective view of a recording tape cartridge of an embodiment of the present invention.

As shown in FIG. 1, a recording tape cartridge 10 has a case 12, which is formed in the shape of a substantially rectangular box. The case 12 is formed by an upper case 14 and a lower case 16, respectively formed from a resin material such as PC, being joined together by ultrasonic welding, screwing, or the like, in a state in which peripheral walls 14A, 16A thereof abut one another.

Figure 2:
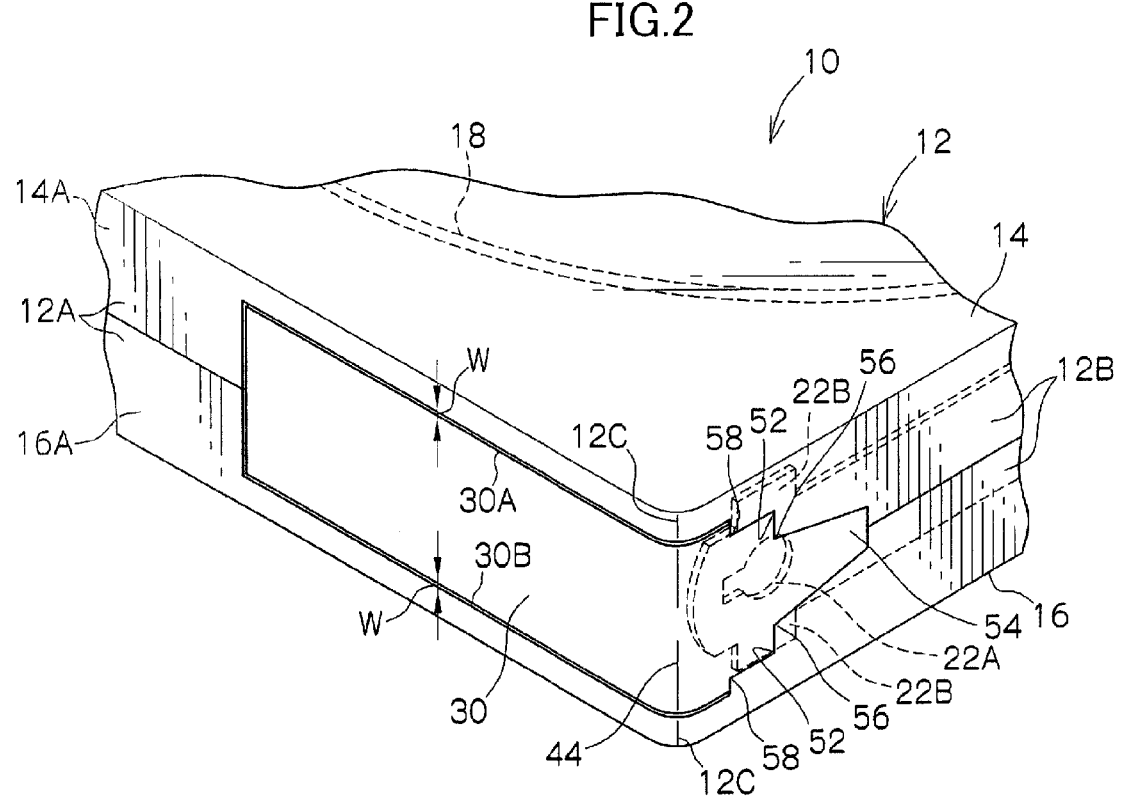
FIG. 2 is a schematic perspective view of the vicinity of an opening of the recording tape cartridge when the opening is closed.
Figure 3:
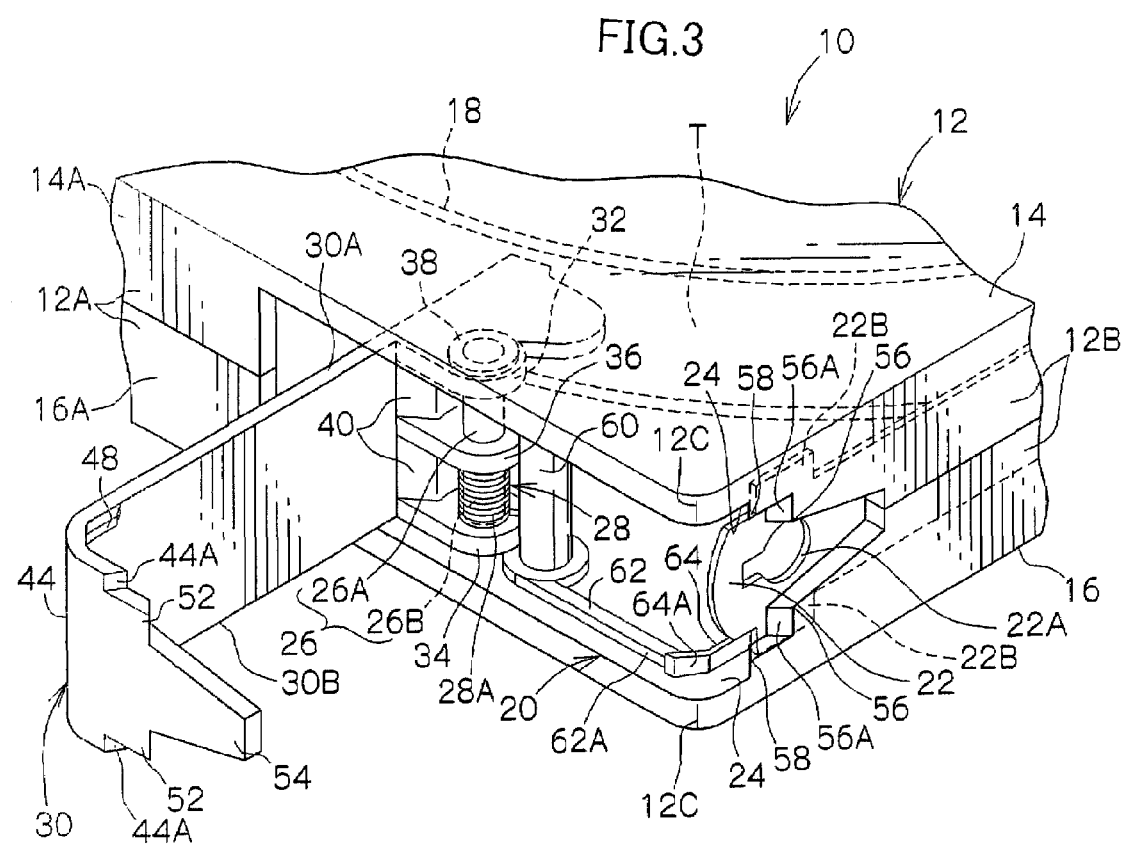
FIG. 3 is a schematic perspective view of the vicinity of the opening of the recording tape cartridge when the opening is opened.

As shown in FIGS. 2 and 3, a single reel 18, around which is wound a recording tape T such as a magnetic tape serving as an information recording medium, is rotatably accommodated in the interior of the case 12. An annular reel gear (not shown) is provided on an under surface of the reel 18. The reel gear is exposed to the exterior through a gear opening (not shown) formed in the lower case 16.

An opening 20 is formed at the front, left corner portion 12C of the recording tape cartridge 10. This opening 20 is provided for the pulling-out, to the exterior, of the recording tape T which is wound around the reel 18. The opening 20 is formed continuously from a front wall 12A and a left wall 12B which are adjacent to the corner portion 12C. A leader tape 22, which is attached to the distal end portion of the recording tape T and is disposed along the left wall 12B, is pulled out from the opening 20.

Note that the corner portion of the present invention refers to an edge formed at a portion where the peripheral walls 14A and 16A of the substantially rectangular case 12 intersect at a substantially right angle or an obtuse angle in plan view. Thus, the corner portion 12C in this case refers to an edge formed at a portion where the front wall 12A and the left wall 12B of the substantially rectangular case 12 intersect at a substantially right angle in plan view. The opening 20 may also be formed in the vicinity of a front, right corner portion 12D.

The leader tape 22 is a pulled-out member which engages with a pull-out member (not shown) of the drive so that the recording tape T is pulled out. An aperture 22A is formed near a distal end portion of the leader tape 22 with which the pull-out member engages. Jutted portions 22B are provided at upper and lower sides of the leader tape 22 at portions further toward the rear than a front end portion of the aperture 22A (i.e., in the vicinity of the distal end portion of the leader tape 22). The jutted portions 22B jut upward and downward from the leader tape 22.

Figure 4:
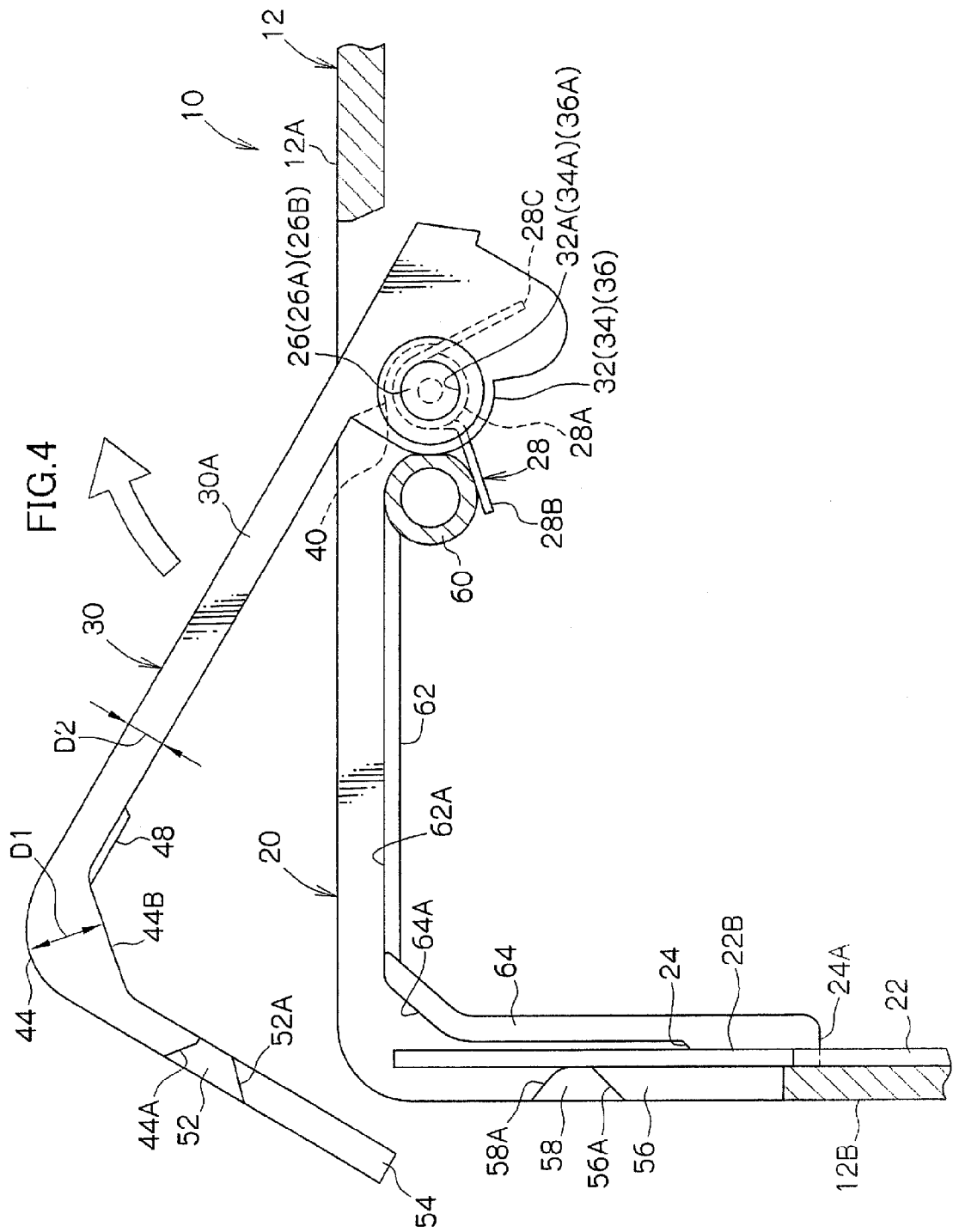
FIG. 4 is a schematic plan view of the vicinity of the opening of the recording tape cartridge when die opening is opened.
Figure 5:
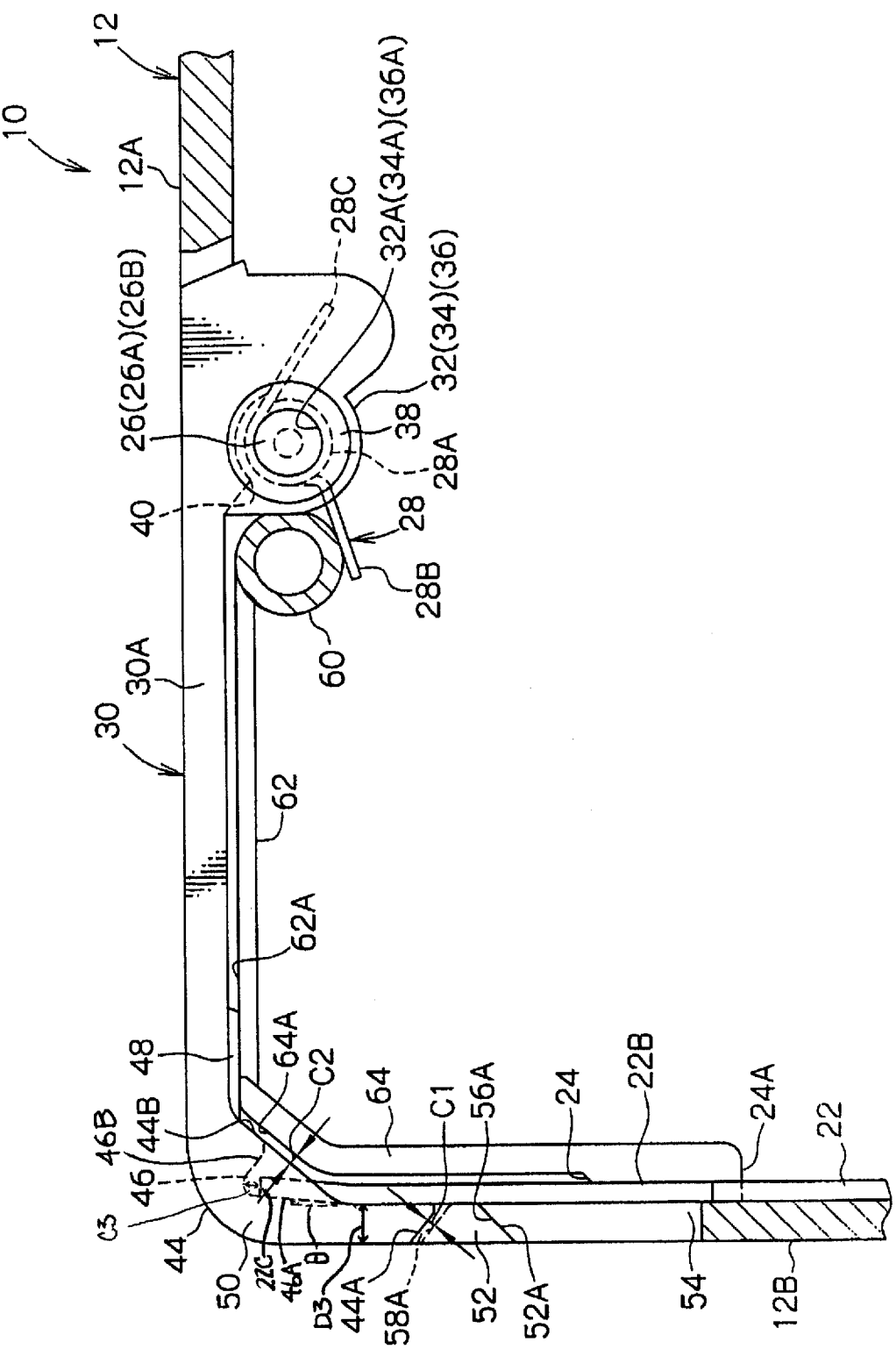
FIG. 5 is a schematic plan view of the vicinity of the opening of the recording tape cartridge when the opening is closed.

The leader tape 22 is held within the case 12 by the jutted portions 22B being accommodated (inserted) in concave receiving portions 24 formed at inner surfaces of the upper case 14 and the lower case 16. Namely, as shown in FIGS. 4 and 5, the concave receiving portions 24 are formed along the left wall 12B so as to be open toward the opening 20 at the front and closed by a rear wall 24A at the rear. Therefore, the leader tape 22 is disposed along the left wall 12B while the positions of the jutted portions 22B are regulated by the rear wall 24A.

As shown in the drawings, when the recording tape cartridge 10 is not being used, the opening 20 is closed by a door 30. The door is formed so as to be bent in a substantial L-shape in plan view and is substantially the same as the opening 20 in shape and size. The door 30 is preferably formed by an olefin resin such as POM, but a resin material such as PC or a metal such as SUS may also be used.

A shaft 26 which is the rotating axis of the door 30 is provided at the front wall 12A side of the upper case 14 and the lower case 16. The shaft 26 is formed as a cylindrical boss 26A at the upper case 14 side and a cylindrical boss 26B at the lower case 16 side thereof. An end (upper end) portion of the boss 26B at the lower case 16 side is placed within the boss 26A at the upper case 14 side to form the shaft 26. Thus, the boss 26B is slightly smaller in diameter than the boss 26A.

Plate-like rotating and sliding portions 32, 34 and 36 are provided in the vicinity of a right end portion of an inner surface of the door 30 (i.e., at a position which is toward the left by a predetermined distance from the right end portion) and project parallel to each other. The rotating and sliding portions 32, 34 and 36 project at upper and lower end portions and a middle portion, slightly offset downward from the center, of the inner surface of the door 30. The rotating and sliding portions 32, 34 and 36 have through holes 32A, 34A and 36A, respectively, in which the shaft 26 is loosely fitted (see FIGS. 4 and 5). The door 30 is rotatably supported by the shaft 26 inserted in the through holes 32A, 34A and 36A.

Annular projecting portions 38 are provided around the through holes 32A and 34A on the upper surface of the rotating and sliding portion 32 of the upper end portion and on the under surface of the rotating and sliding portion 34 of the lower end portion, respectively. The annular projecting portions 38 are brought into contact with the upper case 14 and the lower case 16 so that a clearance W of about 0.3 to 0.5 mm is formed between the top end surface 30A of the door 30 and the upper case 14, and between the bottom end surface 30B of the door 30 and the lower case 16 (see FIG. 2).

Elevated portions 40 are provided at an inner surface of the door 30 between the rotating and sliding portions 32, 34 and 36, and are formed in the shape of an arc in plane cross section along a peripheral surface of the shaft 26.

A winding portion 28A of a torsion spring 28 is fitted onto the shaft 26. The torsion spring 28 constantly urges the door 30 in a direction in which the door 30 closes the opening 20. Namely, the winding portion 28A of the torsion spring 28 is fitted onto the boss 26B, which is smaller in diameter than the boss 26A, while the torsion spring 28 is held between of the rotating and sliding portion 34 at the lower end portion and the rotation sliding portion 36 at the middle portion. An end portion 28B of the torsion spring 28 is anchored on a screw boss provided at the lower case 16 which forms the case 12. The other end portion 28C of the torsion spring 28 is anchored on an edge portion of the right side of the elevated portion 40 between the rotating and sliding portions 34 and 36.

As shown in FIG. 5, a pouch-like receiving portion 46 is provided at an inner surface of a portion 44, of the door 30, which is bent. (This portion 44 is the corner portion 12C of the case 12 and hereinafter referred to as the "bent portion 44"). When the opening 20 is closed, the distal end portion (i.e., a portion further forward than the aperture 22A) of the leader tape 22 enters the receiving portion 46. The receiving portion 46 has a guide portion 46A. As seen in plan view in FIG. 5, the left side inner surface of the guide portion 46A is formed as a thick tapered surface inclined slightly rightward at an angle θ. An inner surface of the receiving portion 46 which is the deepest (hereinafter referred to as the "deepest surface 46B") is formed as an arc surface forming an arc in plan view.

Thus, when the opening 20 is closed, the left side surface of the leader tape 22 abuts the guide portion 46A, and the distal end portion of the leader tape 22 is slightly deflected so as to be away from the left wall 12B. By providing such a guide portion 46A, the receiving portion 46 can be made relatively shallow.

Namely, as compared with a structure in which the left inner surface of the receiving portion is formed as a surface parallel to the left wall 12B, i.e., a surface perpendicular to the front wall 12A, the receiving portion 46 can be made shallow. As a result, a plate thickness D3 of the deepest surface 46B, which is the thinnest because of the receiving portion 46 (i.e., a thinnest plate thickness D3 of the door 30) may be 0.6 mm or more. In this case, the plate thickness D3 may be 0.6 to 0.9 mm, preferably 0.6 to 1.5 mm, and more preferably 0.6 to 2.0 mm.

The distal end surface 22C of the leader tape 22 is structured so as not to be in contact with the deepest surface 46B of the receiving portion 46 when the opening 20 is closed. Namely, as shown in FIG. 5, a predetermined clearance C3 is constantly provided between the distal end surface 22C of the leader tape 22 and the deepest surface 46B of the receiving portion 46. The clearance C3 is 0.5 mm or more. Even if the door 30 receives an impact due to a fall or the like of the cartridge, the deepest surface 46B never interferes with (i.e., contacts) the distal end surface 22C of the leader tape 22.

Because the door 30 closes the opening 20 with play of about 0.2 mm in a direction in which the door 30 rotates, when the door 30 receives an impact due to a fall or the like of the cartridge, the door 30 may rotate about 0.2 mm further in a direction in which the door 30 closes the opening 20. Thus, the clearance C3 between the distal end surface 22C of the leader tape 22 and the deepest surface 46B of the door 30 is formed to be 0.5 mm or more so that the deepest surface 46B of the door 30 does not interfere with or contact the distal end surface 22C of the leader tape 22 even in such a case.

At the inner surfaces of the upper and lower cases 14 and 16 in the vicinity of the opening 20, a rib 62 of predetermined height is provided parallel to the front wall 12A and extending from a front end portion of a rib 64, which will be described later, and the screw boss 60. Further, as shown in FIG. 3, a projection 48 of predetermined height is provided at a top end portion and a bottom end portion of the inner surface of the door 30 at a portion father to the right (i.e., to the front wall 12A side) than the bent portion 44. Thus, when the door 30 closes the opening 20, the projection 48 provided at the inner surface of the door 30 abuts an outer surface 62A of the rib 62. The outer surface 62A of the rib 62 corresponds to a first abutting portion in the present invention.

A distal end portion 54 of the door 30 at the left wall 12B side thereof is formed in the shape of a trapezoid in side view, and the width in the top and bottom direction thereof is formed smaller than that of the front wall 12A side of the door 30. A stepped portion 52 is formed at the top and bottom end surfaces of the door 30 between the distal end portion 54 and the bent portion 44, such that the width between the top and bottom stepped portions 52 is smaller than that of the bent portion 44 and wider than that of the distal end portion 54. Thus, the left wall 12B in which the opening 20 is formed also includes a stepped portion 56 of shape matching with the shape of the stepped portion 52.

As shown in FIGS. 4 and 5, an end surface 44A of the bent portion 44 at the distal-end-side thereof and an end surface 52A of the stepped portion 52 at the distal-end-side thereof are inclined such that imaginary extensions thereof intersect each other at an inner side of the door in plan view. Accordingly, corresponding end surfaces 56A, 58A are formed at stepped portions 56 and 58 of the case 12 as well so as to be inclined such that imaginary extensions thereof intersect each other at an inner side of the left wall 12B in plan view. The end surface 56A of the stepped portion 56 corresponds to the first abutting portion, and the end surface 58A of the stepped portion 58 corresponds to the second abutting portion of the present invention.

In particular, when the door 30 closes the opening 20, the end surface 52A of the stepped portion 52 abuts the end surface 56A of the stepped portion 56, but the end surface 44A of the bent portion 44 does not abut the end surface 58A of the stepped portion 58. That is, when the door 30 closes the opening 20, there is no clearance between the end surface 52A of the stepped portion 52 and the end surface 56A of the stepped portion 56, but a predetermined clearance C1 is ensured between the end surface 44A of the bent portion 44 and the end surface 58A of the stepped portion 58, as shown in FIG. 5.

An inner surface 44B of the top and bottom end surfaces of the bent portion 44 is formed as an inclined surface in plan view, which is inclined at a predetermined angle with respect to an inner surface of the front wall 12A and with respect to an inner surface of the left wall 12B of the door 30. The plate thickness D1 of the door 30 in the direction in which the door 30 rotates is larger than a plate thickness D2 of the door 30 at the front wall 12A side thereof (Sec FIG. 4). In this way, by forming the top and bottom end surfaces of the bent portion 44 thick, the bent portion 44, which is made thinnest because of the receiving portion 46, can be reinforced.

When the opening 20 is closed, the inner surface 44B of the top and bottom end surfaces of the bent portion 44 faces the outer surface 64A of the rib 64 with a predetermined clearance C2 therebetween. The outer surface 64A has a predetermined height and is provided at the right side of the receiving portion 24 (See FIG. 5). Namely, a distal end portion of the rib 64 is bent rightward at a predetermined angle so as to correspond to the inner surface 44B of the bent portion 44. The outer surface 64A of the distal end portion of the rib 64 which is bent at a predetermined angle corresponds to the second abutting portion of the present invention. Thus, when the door 30 closes the opening 20, the inner surface 44B of the bent portion 44 never abuts the outer surface 64A of the rib 64.

The second abutting portions (the end surface 58A and the outer surface 64A) respectively abut the end surface 44A and the inner surface 44B of the bent portion 44 of the door 30 (i.e., the clearances C1 and C2 become zero) only when the case 12 receives an impact, due to a fall or the like of the cartridge, in the vicinity of the corner portion 12C of the case formed by the upper and lower cases 14 and 16 (including the door 30 which has closed the opening 20) and the door 30 is deflected in the direction of closing the opening 20. The second abutting portions receive the impact force applied thereto due to a fall or the like of the cartridge.

Next, operation of the recording tape cartridge 10 will be described. When the recording tape cartridge 10 is not being used (i.e., when the recording tape cartridge 10 is not loaded in a drive), the opening 20 is closed by the door 30. At this time, the door 30 abuts the first abutting portion. Namely, the projections 48 of the door 30 abut the outer surface 62A of the rib 62, and the end surface 52A of the stepped portion 52 abuts the end surface 56A of the stepped portion 56 of the case 12.

Further, at this time, the leader tape 22 is held within the case 12 along the left wall 12B with the jutted portions 22B being accommodated (inserted) in the concave receiving portions 24. Further, the distal end portion of the leader tape 22 (the portion further toward the end than the aperture 22A) is slightly deflected by the guide portion 46A so as to be spaced away from the left wall 12B.

Therefore, in plan view in FIG. 5, the guide portion 46A is formed to be thicker in the direction in which the distal end portion of the leader tape 22 is spaced away from the left wall 12B. Namely, the left side of the inner surface of the receiving portion 46 is formed as a tapered surface inclined slightly rightward at the angle θ. Thus, the receiving portion 46 is made relatively shallow. As a result, the plate thickness D3 of the receiving portion 46 at the deepest surface 46B (i.e., the thinnest portion of the door 30) may be 0.6 mm or more. In this case, the thickness D3 may be 0.6 to 0.9 mm, preferably 0.6 to 1.5 mm, and more preferably 0.6 to 2.0 mm. Consequently, the strength of the door 30 is sufficiently ensured.

The predetermined clearance C3 is provided between the distal end surface 22C of the leader tape 22 deflected by the guide portion 46A, and the deepest surface 46B of the receiving portion 46. Specifically, the clearance C3 is 0.5 mm or more. Even if the door 30 receives an impact due to a fall or the like of the cartridge, the distal end surface 22C of the leader tape 22 never interferes with (i.e., contacts) the deepest surface 46B of the door 30.

Because the play of the door 30 (in the direction in which the door rotates) with respect to the case 12 is about 0.2 mm, even if the door 30 rotates further toward the direction of closing the opening 20 due to an impact, the deepest surface 46B comes closer to the distal end surface 22C of the leader tape 22 by a distance of only about 0.2 mm. Thus, the distal end surface 22C of the leader tape 22 never interferes with (or contacts) the deepest surface 46B. As a result, defects such as the leader tape 22 becoming caught between the door 30 and the concave receiving portions 24 and being deformed are not caused.

When the case 12 receives an impact, due to a fall or the like of the cartridge, in the vicinity of the corner portion 12C of the case 12, in particular, at the door 30 provided to extend over the corner portion 12C and close the opening 20, the door 30 is slightly deflected and abuts the second abutting portions. Namely, the end surface 44A of the bent portion 44 of the door 30 abuts the end surface 58A of the stepped portion 58, and the inner surface 44B of the top and bottom surfaces of the bent portion 44 abuts the outer surface 64A of the rib 64.

As described above, since the strength of the bent portion 44 is ensured (i.e., the bent portion 44 is rigid) by making the top and bottom surfaces of the bent portion 44 thick in the direction in which the door 30 rotates, the impact force is received by the second abutting portions in a preferable manner. Further, since the end surface 44A of the bent portion 44 and the end surface 52A of the stepped portion 52 are inclined such that imaginary extensions thereof intersect each other at an inner side of the door in plan view, the end surface 52A of the stepped portion 52 slides along the end surface 56A of the stepped portion 56, and therefore, the distal end portion 54 of the door 30 deflects toward the outside. In this way, damage to the door 30 or permanent deformation thereof can be prevented.

Further, when the case 12 is dropped or the like and subjected to an impact in the vicinity of the corner portion 12C thereof, the impact force is received by the screw boss 60 as well. Since the screw boss 60 is provided separately from the shaft 26 and positioned near the shaft 26, the impact force caused by a fall or the like of the cartridge can be received by the screw boss 60, whereby the impact force is prevented from being directly transmitted to the shaft 26. Thus, damage to the shaft 26 or permanent deformation thereof can be prevented.

In the case of recording data on the recording tape T of the recording tape cartridge 10 or reading data recorded thereon, the recording tape cartridge 10 is loaded into the drive (not shown). Namely, the recording tape cartridge 10 is inserted into a loading opening (not shown) of the drive from the front wall 12A side thereof.

Accompanied with this loading, an opening/closing member (not shown) of the drive approaches, abuts and presses the right end portion of the door 30. When the opening/closing member presses the right end portion of the door 30, the door 30 is rotated about the shaft 26 in a direction of an arrow in FIG. 4 (i.e., a clockwise direction) against the urging force of the torsion spring 28, whereby the opening 20 is opened.

At this time, because of the annular projecting portions 38, the clearance W of about 0.3 to 0.5 mm is formed between the top end surface 30A of the door and the upper case 14, and between the bottom end surface 30B of the door 30 and the lower case 16. Thus, the door 30 contacts the upper and lower cases 14 and 16 only at the annular projecting portions 38, and the door 30 can be rotated with small sliding resistance.

It is preferable that at least the rotating and sliding portions 32, 34 and 36 and the annular projecting portions 38 of the door 30 are formed by an olefin resin such as POM. If these parts are formed by an olefin resin, sliding resistance against the upper and lower cases 14 and 16, which are formed of resin such as PC, can further be reduced, and sliding resistance against the shaft 26 can also be reduced.

The winding portion 28A of the torsion spring 28 is positioned between the rotating and sliding portions 34 and 36. If the rotating and sliding portions 34 and 36 are formed of an olefin resin such as POM, the rotating and sliding portions 34 and 36 are less likely to be scraped as compared with the case 12 formed of the resin such as PC. Namely, when the door 30 is rotated and the winding portion 28A of the torsion spring 28 slidingly contacts the door 30, debris caused by friction is less likely to be generated. Thus, there are no adverse effects on the recording tape T.

In any case, when the door 30 is rotated to open the opening 20, the distal end portion (i.e., the left side surface) of the leader tape 22 is spaced away from the guide portion 46A. Subsequently, the distal end portion is restored to its original straight state due to the elasticity of the leader tape 22 itself. Then, the pull-out member (not shown) of the drive approaches the leader tape 22 from the left wall 12B side and engages with the aperture 22A of the leader tape 22.

At this time, since the rear side of the leader tape 22 including the aperture 22A is on standby at a position extremely close to the left wall 12B, the pull-out member can reliably engage with the aperture 22A. Namely, since the distal end portion of the leader tape 22 that is deflected by the guide portion 46A is a portion further toward the front than the aperture 22A, the pull-out member never inaccurately engages with the aperture 22A.

Once the pull-out member engages with the aperture 22A, the pull-out member is moved away from the opening 20 so that the leader tape 22 is pulled out of the case 12. The leader tape 22 pulled out of the case 12 is wound around a take-up reel (not shown) of the drive.

A driving gear (not shown) of the drive enters the recording tape cartridge 10 through a gear opening (not shown) thereof and meshes with a reel gear (not shown) of the reel 18. When the take-up reel and the reel 18 rotate synchronously, the recording tape is sequentially fed to the drive. Data is recorded onto the recording tape T or data recorded therein is read by a read/write head (not shown) of the drive.

When the recording tape cartridge 10 is removed from the drive, the reel 18 is rewound, and the leader tape 22 is removed from the take-up reel and then returned to the case 12 through the opening 20. The jutted portions 22B are accommodated (inserted) in the concave receiving portions 24 and held at predetermined positions within the case 12. After the engagement between the reel gear and the driving gear is released, the recording tape cartridge 10 is ejected from the loading opening. Accompanying the ejection, the opening/closing member is separated from the right end portion of the door 30.

Then, the door 30 is rotated, due to the urging force of the torsion spring 28, in the direction opposite to the direction of the arrow in FIG. 4 (i.e., the counterclockwise direction) about the shaft 26 so as to close the opening 20. Subsequently, the distal end portion of the leader tape 22 enters the receiving portion 46, the projection 48 of the door 30 abuts the outer surface 62A of the rib 62, and the end surfaces 52A of the stepped portions 52 abut the end surfaces 56A of the stepped portions 56. In this way, the opening 20 is closed by the door 30, and the recording tape cartridge 10 is ejected from the drive.

Since the door 30 and the case 12 in the vicinity of the opening 20 are structured as described above, if the region near the corner portion 12C at which the door 30 is provided receives an impact due to a fall or the like of the cartridge, occurrence of trouble such as deformation of the case 12 at the region and the door 30 can be reduced. Thus, with this structure, a recording tape cartridge having excellent impact resistance can be obtained.

What is claimed is:

1. A recording tape cartridge comprising:
   a case which accommodates a single reel, around which a recording tape is wound, such that the reel is rotatable;
   an opening formed at a corner portion extending between a front wall and a side wall of the case, the opening being for pulling-out of a leader member which is attached to a distal end portion of the recording tape; and
   a door which has a bent portion formed in a substantial L-shape in plan view, rotates around a shaft provided at the front wall side, and opens and closes the opening, wherein a plate thickness of the bent portion is larger than all other parts of the door, and a stepped portion is formed at a further end side from the bent portion of the door, wherein the case comprises,
   a first abutting portion which abuts the door when the door closes the opening, and
   second abutting portions which abut an end surface of the bent portion at a door distal-end side thereof and an inner surface of the bent portion, when the door which has closed the opening is deflected in a direction of closing the opening, and which do not abut the end surface of the bent portion at the door distal-end side thereof and the inner surface of the bent portion, when the door closes the opening.

2. The recording tape cartridge of claim 1, wherein the bent portion comprises a receiving portion provided at an inner surface thereof to receive a distal end portion of the leader member, and a predetermined clearance is formed between the distal end portion of the leader member and the inner surface of the bent portion when the door is closed.

3. The recording tape cartridge of claim 2, wherein the door has play with respect to the case when the door is closed, and the clearance is larger than the play.

4. The recording tape cartridge of claim 2, wherein the receiving portion has a guide portion, which is a tapered surface formed such that the inner surface of the bent portion becomes thicker toward a central portion of the bent portion in plan view, the guide portion deflecting the distal end portion of the leader member toward the reel.

5. The recording tape cartridge of claim 1, wherein a predetermined clearance is formed between the second abutting portions and the portions of the door which abut the second abutting portions, when the door is closed.

6. The recording tape cartridge of claim 1, wherein a portion of the door which abuts the first abutting portion is a distal-end-side end surface of the stepped portion of the door, and the distal-end-side end surface of the stepped portion and distal-end-side end surface of the bent portion are inclined such that imaginary extensions thereof intersect each other at an inner side of the door in plan view.

7. A recording tape cartridge which accommodates a recording tape and is loaded into a drive such that a leader member attached to a distal end portion of the recording tape is pulled by the drive out of the recording tape cartridge so that the recording tape is pulled into the drive for use therein, the recording tape cartridge comprising:

a case which has a top plate and a bottom plate and accommodates therebetween a single reel, around which the recording tape is wound, such that the single reel is rotatable, the case having wall surfaces formed at the circumferences of the top plate and the bottom plate, the tape cartridge being loaded with one of the wall surfaces facing the drive, the case having an opening formed at a corner portion extending from the one of the wall surfaces to another of the wall surfaces continuously formed therefrom, the leader member of the recording tape being pulled out through the opening along a predetermined pull-out path; and a door which rotates to open and close the opening, the door having a bent portion formed so as to correspond to the corner portion, wherein a plate thickness of the bent portion is larger than all other parts of the door, and a stepped portion is formed at a further end side from the bent portion of the door, wherein the case comprises, a first abutting portion which abuts the door when the door closes the opening, and second abutting portions which abut an end surface of the bent portion at a door distal-end side thereof and an inner surface of the bent portion, when the door which has closed the opening is deflected in a direction of closing the opening, and which do not abut the end surface of the bent portion at the door distal-end side thereof and the inner surface of the bent potion, when the door closes the opening.

8. The recording tape cartridge of claim 7, wherein:

a receiving portion for receiving a distal end portion of the leader member is formed at an inner surface of the bent portion; and a predetermined clearance is formed between the distal end portion of the leader member and the inner surface of the bent portion.

9. The recording tape cartridge of claim 8, wherein the door has play with respect to the case when the door is closed, and the clearance is larger than the play.

10. The recording tape cartridge of claim 8, wherein the receiving portion has a guide portion, which is a tapered surface formed such that the inner surface of the bent portion becomes thicker toward a central portion of the bent portion in plan view, the guide portion deflecting the distal end portion of the leader member toward the central portion of the bent portion.

11. The recording tape cartridge of claim 7, wherein a predetermined clearance is formed between the second abutting portions and the portions of the door which abut the second abutting portions, when the door is closed.

12. The recording tape cartridge of claim 7, wherein a portion of the door which abuts the first abutting portion is a distal-end-side end surface of the stepped portion of the door, and the distal-end-side end surface of the stepped portion and distal-end-side end surface of the bent portion are inclined such that imaginary extensions thereof intersect each other at an inner side of the door in plan view.

* * * * *